United States Patent [19]

Kobayashi et al.

[11] Patent Number: 4,525,486
[45] Date of Patent: Jun. 25, 1985

[54] PROCESS FOR PREPARING MODIFIED POLYOLEFIN PARTICLES AND FOAMED ARTICLE MADE FROM THE PARTICLES

[75] Inventors: Shigeru Kobayashi, Takatsuki; Munehiro Nakamura, Kobe, both of Japan

[73] Assignee: Kanegafuchi Kagaku Kogyo Kabushiki Kaisha, Osaka, Japan

[21] Appl. No.: 546,523

[22] Filed: Oct. 28, 1983

[30] Foreign Application Priority Data

Oct. 30, 1982 [JP] Japan ................................ 57-191487
Jun. 13, 1983 [JP] Japan ................................ 58-106368
Jun. 13, 1983 [JP] Japan ................................ 58-106369

[51] Int. Cl.³ .............................................. C08J 9/18
[52] U.S. Cl. ...................................... 521/59; 521/56; 521/60; 521/139; 525/242
[58] Field of Search ........................... 521/59, 60, 56; 204/159.16

[56] References Cited

U.S. PATENT DOCUMENTS

| | | | |
|---|---|---|---|
| 2,907,675 | 10/1959 | Gaylord | 204/159.16 |
| 3,111,424 | 11/1963 | Le Clair | 204/159.16 |
| 3,743,611 | 7/1973 | Muroi et al. | 521/96 |
| 4,168,353 | 9/1979 | Kitamori | 521/59 |
| 4,275,023 | 6/1981 | Shimizu et al. | 521/60 |
| 4,303,756 | 12/1981 | Kajimura et l. | 521/59 |
| 4,303,757 | 12/1981 | Kajimura et al. | 521/59 |
| 4,366,263 | 12/1982 | Sato et al. | 521/60 |

*Primary Examiner*—Morton Foelak
*Attorney, Agent, or Firm*—Antonelli, Terry & Wands

[57] ABSTRACT

A process for preparing modified polyolefin particles which comprises dispersing cross-linked polyolefin particles and a polymerizable vinyl monomer capable of dissolving or swelling the cross-linked polyolefin particles in an aqueous medium, impregnating the cross-linked polyolefin particles with the vinyl monomer and polymerizing the vinyl monomer. The obtained modified polyolefin particles can provide a foamed article including uniform and fine cells and having excellent toughness, accuracy of demension, cushioning property, heat resistance and smooth and soft surface.

17 Claims, 4 Drawing Figures

PROCESS FOR PREPARING MODIFIED POLYOLEFIN PARTICLES AND FOAMED ARTICLE MADE FROM THE PARTICLES

BACKGROUND OF THE INVENTION

The present invention relates to a process for preparing modified polyolefin particles and a foamed article made from the particles.

A foamed article made of a polyolefin, especially polyethylene is suitable to a good packing or wrapping material, because the foamed article has excellent toughness, is not easy to be broken and can be repeatedly used. However, the foamed article has drawbacks such as low accuracy of dimension due to its great shrinkage at expansion-molding and low cushioning property due to its limpness. Therefore, there is difficulty in use as a packing and a wrapping material for heavy and large goods. Those drawbacks result from low rigidity of polyolefin which is one of the inherent properties of the polyolefin. In order to improve the rigidity and the cushioning property of a polyolefin foam, there is used a modified polyolefin prepared by impregnating a polyolefin with a polymerizable vinyl monomer, especially styrene, capable of dissolving the polyolefin, and polymerizing the vinyl monomer.

As a process for preparing modified polyolefin particles, there is proposed, for instance, a process in which modified polyolefin particles are prepared by dispersing polyolefin particles into water, adding thereto a styrene monomer which dissolves a catalyst capable of initiating polymerization of the styrene monomer and a cross-linking agent capable of cross-linking the polyolefin, impregnating the polyolefin particles with the styrene monomer, polymerizing the styrene monomer and cross-linking the polyolefin.

According to the above process, however, the polyolefin particles impregnated with the styrene monomer are quite easy to agglomerate with each other and the agglomerated particles are hardened to form a mass in the course of the polymerization of the styrene monomer. When the polymerization of the styrene monomer is carried out at a temperature so that the polyolefin particles are molten, the particles are far easy to agglomerate with each other because the particles tend to melt and fuse with each other. Therefore, the polymerization is generally carried out at a temperature of not more than the softening point of the polyolefin. In order to carry out the polymerization at that condition, it is required that the vinyl monomer is gradually added over a long time for completing the uniform impregnation of the styrene monomer. According to the procedure, however, since the styrene monomer is hard to be introduced into the particles, the styrene monomer tends to be polymerized in water before the impregnation.

For improving the procedure in the impregnation of the vinyl monomer, there are proposed a process in which another particular polyolefin having low softening point is used and a process in which a softening agent such as dioctyl phthalate is added to the polyolefin.

In the above-mentioned processes, however, there is a drawback that a large amount of a cross-linking agent is required since the cross-linking agent is consumed in the polymerization of the styrene monomer.

There is also proposed another process for preparing modified polyolefin particles by dissolving cross-linked polyolefin particles in a large amount of an organic solvent, adding a methacrylate monomer thereto, and polymerizing the monomer. In the process, the impregnation of the methacrylate monomer is carried out at a temperature of less than the softening point of the polyolefin which is not yet cross-linked. According to that process, however, the particles are easy to stick and agglomerate with each other, and the impregnation cannot be carried out at a high temperature and for a short time, since the cross-liked polyolefin particles are dissolved in a large amount of the organic solvent. Furthermore the process requires much labor for removing the organic solvent used for dissolving the cross-linked polyolefin after completion of the polymerization.

Another process is proposed in Japanese Examined patent publication No. 46138/1976 for employing various polyolefins having various softening points. In the process, modified polyolefin particles are prepared by impregnating polyolefin particles with a styrene monomer, polymerizing the monomer, and then cross-linking the polyolefin. According to the process, however, the obtained modified particle merely contains large styrene polymer particles dispersed therein because the impregnation of the styrene monomer occurs only between the molecules in the amorphous portion of the polyolefin. As a result, cells in the foamed article obtained from such particles are large and are not uniform.

In general, modified polyolefin particle in which fine vinyl polymer particles are uniformly distributed can provide a foamed article having excellent cushioning property, accuracy of dimension, surface touch, and the like. The vinyl polymer particles in the modified polyolefin particles obtained by the conventional processes, however, vary in size and are not uniformly distributed, and also cells in the obtained foamed article are large and are not uniformly distributed, and the number of the cells is small, i.e. at most about 150 per 1 $mm^2$ of the foamed article. Those foamed articles are easy to shrink, rough to the touch and inferior in cushioning property. Therefore, the conventional foamed articles are not suitable as a packing material for goods which need tough protection from any external impact, such as a camera, a watch and an electronic printer, especially for goods which are easy to be injured by the rough surface of the packing materials, such as a high-class ornamental article.

An object of the present invention is to provide a process for preparing modified polyolefin particles in which impregnation of a vinyl monomer can be rapidly carried out without any agglomeration of particles, the modified polyolefin particles which have fine polymer particles of the vinyl monomer uniformly distributed therein, and are usable in preparation of a foamed article.

Another object of the present invention is to provide a foamed article of polyolefin which includes uniform and fine cells and is suitable for a packing or wrapping material for goods to be protected from external impact and surface injury.

These and other objects of the present invention will become apparent from the description hereinafter.

SUMMARY OF THE INVENTION

According to the present invention there can be provided a process for preparing modified polyolefin particles which comprises dispersing cross-linked polyolefin particles and a polymerizable vinyl monomer capable of dissolving or swelling the cross-linked polyolefin particles in an aqueous medium, impregnating the cross-linked polyolefin particles with the vinyl monomer and polymerizing the vinyl monomer. The obtained modified polyolefin particles can provide a foamed article including uniform and fine closed cells and having excellent toughness, accuracy of dimension, cushioning property, heat resistance and smoothness and softness to the touch.

DETAILED DESCRIPTION

The cross-linked polyolefin used in the present invention is prepared, for instance, by cross-linking a polyolefin with a cross-linking agent such as an organic peroxide, by radiating radioactive rays such as α-rays or β-rays, or by any other conventional cross-linking processes. It is preferable to employ a polyolefin cross-linked with an organic peroxide such as dicumyl peroxide, 2,5-di-t-butyl peroxybenzoate or benzoyl peroxide.

As the polyolefin to be cross-linked, various polyolefins having various densities, melt index (MI) and softening points can be employed. Examples of the polyolefin to be cross-linked are, for instance, a homo- or copolymer of monoolefinically unsaturated monomer such as ethylene, propylene, butene-1, pentene-1, 3-methylbutene-1, 4-methylbutene-1, 4-methylhexene-1 or 5-methylhexene-1; a copolymer of the above monoolefinically unsaturated monomer and other copolymerizable vinyl monomer, such as ethylene-vinyl acetate copolymer, ethylene-vinyl chloride copolymer or ethylene-methylmethacrylate copolymer; and an admixture thereof.

Cross-linking degree of the cross-linked polyolefin is evaluated by extracting the cross-linked polyolefin enveloped in a 200 mesh pass wire net with boiling xylene for 24 hours and calculating weight percent of the remaining insoluble portion to the cross-linked polyolefin. The preferable cross-linking degree is 10 to 80% (% by weight, hereinafter the same). The cross-linked polyolefin particles having a cross-linking degree of less than 10% can also exhibit almost of the desired effects, but partially agglomerate with each other when the particles are impregnated with the vinyl monomer. In case that the cross-linking degree is more than 80%, impregnation of the vinyl monomer becomes slow and uneven, and a homopolymer of the vinyl monomer is easy to be produced outside the particle, and further a large amount of a cross-linking agent is required to obtain such high cross-linking degree, which is disadvantageous in cost.

Preferable particle size of the cross-linked polyolefin particle is about 0.25 to 10 mm.

The polymerizable vinyl monomer used in the present invention is a monomer capable of dissolving or swelling the cross-linked polyolefin particle. Examples of the vinyl monomer are, for instance, a styrene monomer such as styrene, α-methylstyrene, p-methylstyrene; acrylonitrile; methylmethacrylate; vinyl chloride; vinyl acetate; and the like. Preferable vinyl monomer is a styrene monomer.

The cross-linked polyolefin particles and the vinyl monomer are dispersed in an aqueous medium such as water with a dispersing agent. Typical examples of the dispersing agent are, for instance, a water soluble polymer such as polyvinyl alcohol or methylcellulose and an inorganic compound which is difficult to be dissolved in water such as calcium phosphate, magnesium carbonate or magnesium pyrophosphate.

The dispersing procedure may be carried out by dispersing the cross-linked polyolefin particles in the aqueous medium and adding at once or gradually thereto the vinyl monomer in which a polymerization initiator is dissolved, or may be carried out by dispersing the cross-linked polyolefin particles in the aqueous medium and adding at once or gradually thereto the vinyl monomer and then an initiator, or may be carried out by dispersing the cross-linked polyolefin particles impregnated with an initiator and adding at once or gradually thereto the vinyl monomer.

The aqueous medium may previously be heated or may be heated after the addition of the vinyl monomer.

Particularly in case of employing the last procedure, i.e. employing the cross-linked polyolefin particles impregnated with an initiator, agglomeration of the particles and the homopolymerization of the vinyl monomer outside the particles can be remarkably prevented.

The impregnation of the vinyl monomer is carried out in the above aqueous system. The impregnation temperature is preferably not less than the softening point (measured according to ASTM D 1525-70) of a non cross-linked polyolefin, i.e. the polyolefin which is not yet cross-linked, particularly not less than the softening point of the non cross-linked polyolefin plus 5° C., most particularly not less than the middle temperature of the softening point and the melting point of the non cross-linked polyolefin. At that temperature, the cross-linked polyolefin particles are uniformly and fast impregnated with the vinyl monomer because the cross-linked polyolefin particles are softened.

The cross-linked polyolefin particles are impregnated with the vinyl monomer in various amounts, preferably in an amount of 5 to 300 parts (part by weight, hereinafter the same), most preferably 15 to 300 parts per 100 parts of the cross-linked polyolefin particles. When the impregnation amount of the vinyl monomer is more than 300 parts, a foamed article made from the obtained modified cross-linked polyolefin particles has too rigid and rough to the touch to lose characteristic properties of polyolefin foam such as elasticity, smoothness and softness to the touch, while when the impregnation amount of the vinyl monomer is less than 5 parts the desired properties such as rigidity and toughness by impregnation of the vinyl monomer become unsatisfactory.

In the present invention the polymerization reaction of the vinyl monomer may be carried out at the same time or may be carried out after the impregnation.

The polymerization is initiated with a polymerization initiator. The initiator is added, as aforementioned, before, at the same time or after the addition of the vinyl monomer. Also, the cross-linked polyolefin particles are previously impregnated with the initiator. Furthermore the remaining cross-linking agent used for the cross-linking reaction of the polyolefin can be used as an initiator of the polymerization. As the initiator or the cross-linking agent, various initiators or cross-linking agents which can effectively act at a polymerization or cross-linking temperature are usable.

Typical examples of the initiator or the cross-linking agent are, for instance, n-butyl 4,4-bis(t-butylperoxy)-valerate, 2,2-bis(t-butylperoxy)butane, t-butylcumyl peroxide, 2,5-dimethyl-2,5-(t-butylperoxy)hexane, t-butyl peroxyacetate, t-butyl peroxybenzoate, di-t-butyl peroxide, dicumyl peroxide, t-butyl peroxylaurate, benzoyl peroxide, t-butyl peroxyisobutyrate, and the like. An amount of the initiator varies depending on kind of the used initiator, polymerization temperature, amount of the vinyl monomer, etc. Preferable amount is about 0.01 to 5 parts per 100 parts of the vinyl monomer. When the active cross-linking agent sufficiently remains in the cross-linked polyolefin, the polymerization initiator may not be added.

The polymerization temperature is above the decomposition temperature of the initiator. In case of carrying out the impregnation and the polymerization at the same time, the polymerization temperature is not less than the softening point of the non cross-linked polyolefin. The upper limit of the impregnation and polymerization temperatures is defined from viewpoints of a decomposition temperature of an initiator and an economical efficiency, and is about 160° C.

Impregnation time and polymerization time vary depending on temperature, kind and amount of the vinyl monmer, kind and cross-linking degree of the polyolefin, kind and amount of the initiator, and the like. In case of carrying out the impregnation and the polymerization at the same time and at a temperature of not less than a softening point of the non cross-linked polyolefin, the impregnation and the polymerization can be satisfactorily completed in general within about 1 to about 3 hours.

The modified polyolefin particle prepared by the present invention includes a large number of fine vinyl polymer particles which are uniformly distributed in the polyolefin particle, because a space between the molecules in amorphous portion of the cross-linked polyolefin is divided into a large number of fine spaces by intermolecular cross-linkage, and the vinyl monomer is introduced into such finely divided spaces and polymerized therein.

The modified polyolefin particles prepared by the present invention are usable for producing a foamed article of polyolefin which has not less than 200 closed cells per 1 mm$^2$ of the foamed article, and has excellent toughness, accuracy of dimension, cushioning property, heat resistance, cutting property and smoothness and softness to the touch.

The foamed article is prepared by expanding the modified polyolefin particles according to various conventional expansion processes. For instance, the foamed article is prepared by impregnating the particles with a foaming agent and expanding the expandable particles by heating with steam, or by impregnating the particles with a foaming agent in a medium under heat and pressure and releasing the mixture into low pressure zone such as atmospheric pressure to cause expansion. The foamed article may be produced in various forms such as a particle and other molded goods.

Examples of the foaming agent are, for instance, an aliphatic hydrocarbon compound such as propane, butane, pentane or hexane; a cycroaliphatic hydrocarbon compound such as cycropropane, cycrobutane, cycropentane or cycrohexane; a halogenated hydrocarbon compound such as methyl chloride, ethyl chloride, trichloromonofluoromethane, dichlorodifluoromethane, dichloromonofluoromethane, dichlorotetrafluoroethane or tetrachlorodifluoroethane; and the like. In case of using an aliphatic hydrocarbon compound or a cycroaliphatic hydrocarbon compound, the expandable particles impregnated with such foaming agent must be aged in order to produce uniform and fine cells, while in case of using a halogenated hydrocarbon compound a foamed article having uniform and fine cells can be obtained without aging the expandable particles.

The expandable polyolefin particle which can provide most preferable foamed article comprises 25 to 87% of the cross-linked polyolefin portion and 13 to 75% of a styrene polymer portion. When the content of the styrene polymer is less than 13%, the obtained foamed article is inferior in toughness and rigidity, and the cell size of the obtained foamed article is not sufficiently fine. When the content is more than 75%, the obtained foamed article is inferior in elasticity, and the cell size of the obtained foamed article is too large to provide smooth touch to the foamed article.

Preferable cross-linking degree of the expandable polyolefin particle is 15 to 80%. When the cross-linking degree is less than 15%, it is difficult to obtain uniform and fine cells, and sometimes large cavities are produced in the foamed article, and also the foamed article is inferior in heat resistance. When the cross-linking degree is more than 80%, a large amount of the cross-linking agent is required and there causes a problem in molding process such that it becomes difficult to fuse pre-expanded particles in a closed mold.

The foamed article of the present invention has not less than 200 closed cells per 1 mm$^2$ of the foamed article.

In the present invention, the number of closed cells per 1 mm$^2$ is an average value measured by cutting at least 100 foamed particles, selecting 10 foamed particles having the average cell size among them and counting the numbers of the closed cells per 1 mm$^2$ of the center portion of the 10 foamed particles. Although the number of closed cells does not vary depending on a measuring portion of a foamed particle excepting the outermost skin portion, it is preferable to measure it at a center of foamed particle because disturbance of cells at an outer layer occurs depending on molding conditions when the foamed particles are molded in a mold. In case that the closed cells of a foamed article are less than 200 per 1 mm$^2$, the foamed article is inferior in surface properties such as smoothness and softness.

In order to provide a foamed article having smoother and softer surface, it is preferable that the foamed article includes the number of closed cells per 1 mm$^2$ represented by the equation:

$$\text{Number of closed cells} \geq 200 \times (50d)^{2/3}$$

wherein d represents a density (g/cm$^3$) of the foamed article. The density is determined by measuring the volume of the foamed article by soaking it in water. The preferable density of the foamed article is 0.02 to 0.08 g/cm$^3$. When the density is less than 0.02 g/cm$^3$, cells in the foamed article tend to form open cells and a foamed article having uniform and fine cells is hardly obtained. When the density is more than 0.08 g/cm$^3$, the foamed article becomes too hard.

The foamed article of the present invention has uniform and fine cells, and has excellent toughness, accuracy of dimension, cushioning property, chemical resistance, impact resistance, heat resistance, flexibility and elasticity, and the surface of the foamed article is very smooth and soft. Furthermore, the foamed article cannot shrink and buckle because the article includes the uniform and fine cells.

The foamed article of the invention is particularly suitable as a packing or wrapping material for goods to be protected from external impact and surface injury such as a camera, a watch, an electronic printer and a high-class ornamental article.

The present invention is more particularly described and explained by means of the following Examples, in which all percents are percents by weight unless otherwise noted. It is to be understood that the present invention is not limited to the Examples and various changes and modifications may be made in the invention without departing from the spirit and scope thereof.

Example 1

An autoclave of 1.5 l was charged with 800 cc of water, 3.0 g of calcium phosphate, 200 mg of sodium dodecylbenzenesulfonate and 200 g of cross-linked polyethylene particles made of polyethylene (Vicat softening point: 91° C., melting point: 107° C., MI: 1.5, density: 0.919 g/cm$^3$), and having an average particle size of about 2.0 mm and a cross-linking degree shown in Table 1. After stirring the mixture, to the dispersion thus obtained was added 200 g of styrene containing 0.4 g of benzoyl peroxide, and the temperature of the dispersion was raised to 105° C., and then the polymerization reaction was carried out for 5 hours. After completion of the reaction, the reaction mixture was cooled to below 60° C. and the product was taken out of the autoclave.

The appearance of the interior of the autoclave and the condition of the obtained particles were observed. The results are shown in Table 1.

TABLE 1

| Experimental No. | Degree of cross-linking (%) | Appearance of interior of autoclave | Condition of particles |
|---|---|---|---|
| 1 | 0 | About one third of the particles agglomerated and were adhered to the inner wall. | Particles were melted and fused with each other and flattened. |
| 2 | 5 | About 10 g of agglomerated particles were adhered to the inner wall. | Almost all the particles agglomerated to form masses, one for every several particles. |
| 3 | 12 | A little scale was adhered to the inner wall and the blades. | A few particles aglomerated. |
| 4 | 30 | No scale was adhered. | No agglomeration of particles occured. |
| 5 | 57 | No scale was adhered. | No agglomeration of particles occured. |
| 6 | 65 | A little styrene homopolymer powder gas phase portion of the inner wall. | No agglomeration of particles occured. |

As is clear from Table 1, the agglomeration of the particles is greatly reduced by using a cross-linked polyethylene particles. In case of using a cross-linked polyethylene having a cross-linking degree of 10 to 60%, the adhesion of the scale to the autoclave and the agglomeration of the particles scarcely occur, and no styrene homopolymer is not produced, which proves the fact that the polyolefin particles are rapidly impregnated with styrene in that condition without forming styrene homopolymer.

Example 2

An autoclave of 1.5 l was charged with 800 cc of water, 3.0 g of calcium phosphate, 200 mg of sodium dodecylbenzenesulfonate and 0.3 g of benzoyl peroxide and 200 g of cross-linked ethylene-vinyl acetate copolymer particles made of ethylene-vinyl acetate copolymer (vinyl acetate content: 10%, density: 0.93 g/cm$^3$, MI: 1.5, Vicat softening point: 73° C.), and having an average particle size of about 1.2 mm and a cross-linking degree shown in Table 2. After stirring the mixture, the temperature of the obtained dispersion was raised to 100° C. and maintained at 100° C. for 1 hour, and then 200 g of sytrene was gradually added over 20 min. THe mixture was kept at 100° C. for another 20 min, and after raising the temperature of the reaction mixture to 140° C., the polymerization reaction was carried out for 3 hours. After completion of the reaction the reaction mixture was cooled to below 60° C. and taken out of the autoclave. The condition of the particles and the appearance of the interior of the autoclave were observed. The results are shown in Table 2.

In every case, the waste water was almost clear and no styrene homopolymer was produced.

TABLE 2

| Experimental No. | Degree of cross-linking (%) | Appearance of interior of autoclave | Condition of particles |
|---|---|---|---|
| 1 | 0 | About one third of the particles agglomerated and were adhered to the inner wall. | Particles were melted and fused with each other and flattened. |
| 2 | 7 | A little scale was adhered to the inner wall and the blades. | A few particles agglomerated. |
| 3 | 12 | No scale wass adhered. | No agglomeration of particles occured. |
| 4 | 50 | No scale was adhered. | No agglomeration of particles occured. |
| 5 | 77 | No scale was adhered. | No agglomeration of particles occured. |

As is clear from Table 2, the agglomeration and adhesion of the particles are greatly reduced by using a cross-linked polymer particles. For instance, in case of using a cross-linked polymer having a cross-linking degree of not less than 10%, the adhesion of the scale to the autoclave and the agglomeration of the particles do not occur, and styrene homopolymer is not produced, which proves the rapid impregnation of styrene in that condition.

Example 3

A polymerization vessel of 80 l was charged with 8 kg of styrene, 200 g of calcium phosphate, 10 g of sodium dodecylbenzenesulfonate, 35 g of benzoyl peroxide, 40 l of water and 12 kg of cross-linked polyethylene particles made of polyethylene (Vicat softening point: 95° C., melting point: 112° C., MI: 1.2, density: 0.920 g/cm³), and having an average particle size of about 1.5 mm and a cross-linking degree of 43%. After stirring the mixture, the impregnation and polymerization of styrene were carried out for 5 hours at a temperature shown in Table 3. After completion of the polymerization, the product was taken out of the vessel and observed the condition of the particles, existance of styrene homopolymer, degree of impregnation of styrene evaluated by slicing the particle and observing the tone of color of the sliced surface, and styrene content measured by infrared ray analysis.

The results are shown in Table 3.

TABLE 3

| Experimental No. | Impregnation and polymerization temperature (°C.) | Styrene content (%) | Condition of particles | Existance of styrene homopolymer | Degree of impregnation of styrene |
|---|---|---|---|---|---|
| 1 | 90 | 26 | Particles agglomerated to form masses, one for every several particles. | Styrene homopolymer powder existed. | Outer part of particle was more impregnated with styrene than inner part thereof. |
| 2 | 100 | 37 | A few particles agglomerated. | No styrene homopolymer powder existed. | Degrees of impregnation of styrene at outer part and inner part of particle were almost the same. |
| 3 | 110 | 39 | No agglomeration of particles occured. | No styrene homopolymer powder existed. | Degrees of impregnation of styrene at outer part and inner part of particle were almost the same. |
| 4 | 140 | 38 | A few particles agglomerated. | No styrene homopolymer powder existed. | Degrees of impregnation of styrene at outer part and inner part of particle were almost the same. |

As is clear from Table 3, in case of carrying out the impregnation and polymerization at a temperature of not less than 100° C., since any styrene homopolymer powder is not produced, the particles are uniformly and rapidly impregnated with styrene.

Example 4

100 Parts of ethylene-vinyl acetate copolymer particles (Vicat softening point: 83° C., MI: 2, average particle size: about 2 mm, vinyl acetate content: 5%, density: 0.92 g/cm³) were impregnated with 0.24 parts of dicumyl peroxide, and cross-linking reaction was carried out for 1 hour at 150° C. to give cross-linked particles having a cross-linking degree of 62%. A polymerization vessel of 80 l was charged with 8 kg of the cross-linked polymer particles, 200 g of calcium phosphate, 8 g of sodium dodecylbenzenesulfonate, 16 kg of styrene and 40 l of water, and the mixture was stirred. The temperature of the dispersion was gradually raised to 130° C. over 2 hours, and the polymerization was carried out for 4 hours at 130° C. After completion of the polymerization, the product was taken out of the vessel.

No scale was adhered to the interior of the vessel, and any agglomeration of the particles and any styrene homopolymer in the waste water were not observed.

Example 5

A polymerization vessel of 80 l was charged with 12 kg of polyethylene particles (average particle size: about 2.7 mm, MI: 1.5, density: 0.924, Vicat softening point: 95° C., melting point: 112° C.), 200 g of calcium phosphate, 8 g of sodium dodecylbenzenesulfonate, 30 g of di-t-butyl peroxide and 40 l of water, and then the mixture was stirred. The temperature of the dispersion was raised to 160° C. and cross-linking reaction was carried out at 160° C. After the cross-linking reaction was completed the reaction mixture was cooled to about 150° C. Then, 8 kg of styrene was added at once to the reaction mixture, so that the temperature of the mixture became 140° C. The polymerization was carried out for 5 hours while keeping a reaction temperature at 140° C.

The cross-linking degree of the above cross-linked polyethylene was 52%.

No scale was adhered to the interior of the vessel, and any agglomeration of the particles and any styrene homopolymer in the waste water were not observed.

For the purpose of evaluating the degree of the impregnation of styrene, the obtained modified polyethylene particle was sliced and the tone of color of the sliced surface was observed. As a result, styrene polymer particles were uniformly distributed all over the polyethylene particle.

The obtained polyethylene particles were further impregnated with dichlorodifluoromethane at 60° C. under a dichlorodifluoromethane atmosphere, and then heated and expanded for 15 sec by means of steam under a pressure of 1.7 kg/cm² G to give pre-expanded particles having an apparent expansion ratio of 37 times and being non-shrinkable. The pre-expanded particles were placed in a mold which could shut the particles therein, but could not be unhermetically sealed, and heated by means of steam under a pressure of 1.2 kg/cm² G to give a foamed article having an expansion ratio of 35 times.

The obtained article included uniform and fine cells and minute polystyrene particles uniformly distributed. As a result, great force was required for denting the article with a human hand, while a commercially available polyethylene foam made by beads expansion molding was easy to dent with a human hand. Thus, it is understood that the article prepared by the process of the present invention has good cushioning property with increased rigidity.

Example 6

The particles obtained in Experimental No. 3 of Example 3 were impregnated with dichlorodifluoromethane at 60° C., and heated and expanded for 15 sec by means of steam under a pressure of 1.7 kg/cm² G to give non-shrinkable pre-expanded particles having an apparent expansion ratio of 30 times. After aging for 24 hours, the pre-expanded particles were placed in a mold and heated by means of steam under a pressure of 1.2 kg/cm² G to give a foamed article having an expansion ratio of 29 times. The article had uniform and fine cells, but included no large polystyrene particle. Polystyrene particles were also uniformly distributed all over the foamed article. The obtained article was superior in rigidity to a commercially available polyethylene foam made by beads expansion molding.

In comparison, when the cross-linked polyethylene particles used in Example 3 having a cross-linking degree of 43% which was not impregnated with the styrene was subjected to the impregnation of diclorodifluoromethan and expansion in the same manner as described above, the pre-expanded particles which were shrinked and had an apparent expansion ratio of 15 times were merely obtained.

Example 7

Into 600 cc of water in which 3 g of polyvinyl alcohol was dissolved, 200 g of polyethylene particles (Vicat softening point: 109° C., melting point: 119° C., MI: 7, density: 0.935 g/cm³, average particle size: about 1.8 mm) were dispersed. After adding 1.0 g of dicumyl peroxide as a cross-linking agent, the temperature of the mixture was raised to 150° C. and cross-linking reaction was carried out for 3 hours, and then the reaction mixture was cooled to 40° C. to give cross-linked polyethylene particles having a cross-linking degree of 35%.

To the resulting mixture was added 100 g of styrene into which 0.4 g of t-butyl peroxybenzoate was dissolved, and the temperature of the mixture was raised to 120° C. and the reaction was carried out for 4 hours. After cooling to below 60° C., the reaction mixture was taken out of the polymerization vessel.

No scale adhered to the reaction vessel and no agglomeration of the particles were observed, and any styrene homopolymer was not produced. When the thus obtained particle were impregnated with dichlorodifluoromethane and expanded in the same manner as in Example 6, the foamed particles having uniform and fine cells were obtained.

In comparison, 200 g of the same polyethylene particles as used above was dispersed into 600 cc of water in which 1 g of t-butyl peroxybenzoate and 1.0 g of dicumyl peroxide were dissolved, and the particles were impregnated with styrene for 3 hours at 90° C. After the polymerization was carried out for 4 hours at 120° C. and for another 3 hours at 150° C., the reaction mixture was cooled and taken out of the vessel. In this case, the agglomeration of the particles and a large amount of scale adhered to the vessel were observed. Also the waste water from which the particles were recovered was milky due to styrene homopolymer. A cross-linking degree of the obtained polyethylene particles was merely 11%, which proves that the cross-linking efficiency of dicumyl peroxide was appearantly reduced in that condition. When the obtained particles were impreganted with dichlorodifluoromethane and expanded, the resulting foamed particles had large cavities therein and various cells in size.

Example 8

A reaction vessel of 1 l was charged with 100 g of styrene into which 0.1 g of dicumyl peroxide was dissolved and 100 g of cross-linked ethylene-vinyl acetate copolymer having a cross-linking degree of 77% and obtained by cross-linking ethylene-vinyl acetate copolymer (vinyl acetate content: 15%, MI: 1.5, Vicat softening point: 67° C., density: 0.93 g/cm³). To the mixture were added 2.0 g of calcium phosphate, 0.1 g of sodium dodecylbenzenesulfonate as an emulsifier and 500 g of demineralized water, and then the admixture was stirred. The temperature of the dispersion was raised to 130° C. and maintained at 130° C. for 4 hours so that the cross-linked ethylene-vinyl acetate copolymer particles were impregnated with styrene and the polymerization of styrene occurred. The obtained modified copolymer particles had an average particle size of about 1.2 mm.

Figure 1:
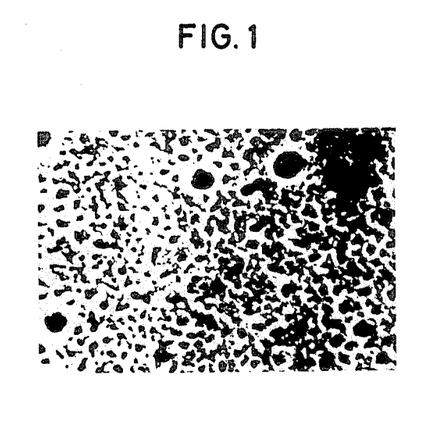
FIG. 1 is an electron microphotograph of 10,000 magnification showing a sliced surface of the modified polyolefin particle prepared by the process of the present invention.

For observing the distribution of styrene polymer particles in the copolymer particles, the obtained particle was sliced and soaked in tetrahydrofuran for 24 hours to extract and remove the styrene polymer from the copolymer particle. FIG. 1 is an electron microphotograph of 10,000 magnification showing the sliced surface of the particle. As is clear from FIG. 1, a number of very fine particles of the styrene polymer were uniformly distributed all over the sliced surface.

The particles were impregnated with dichlorodifluoromethan at 50° C. under a dichlorodifluoromethan atmosphere to give expandable particles. The expandable particles were expanded by heating by means of steam under a pressure of 0.4 kg/cm² G in a known batchwise pressurized pre-expansion vessel for a period shown in Table 4. The numbers of cells of the thus obtained pre-expanded particles were measured. The results are shown in Table 4.

All the pre-expanded particles had uniform and fine cells, were not rough but smooth in the sliced surface thereof, and had excellent appearance.

TABLE 4

| Experimental No. | Period for heating and foaming (sec) | Density of pre-expanded particles (g/cm³) | Number of cells per mm² | Appearance of cells | Touch of surface | Calculated number of cells per mm² |
|---|---|---|---|---|---|---|
| 1 | 4 | 0.042 | 427 | Very uniform and fine | Smooth | 328 |
| 2 | 6 | 0.036 | 365 | Very uniform and fine | Smooth | 296 |

TABLE 4-continued

| Experimental No. | Period for heating and foaming (sec) | Density of pre-expanded particles (g/cm³) | Number of cells per mm² | Appearance of cells | Touch of surface | Calculated number of cells per mm² |
| --- | --- | --- | --- | --- | --- | --- |
| 3 | 8 | 0.031 | 319 | Very uniform and fine | Smooth and soft | 268 |
| 4 | 10 | 0.028 | 283 | Very uniform and fine | Smooth and soft | 250 |

The "calculated number of cells" in Table 4 is defined according to the following equation:

$$\text{Calculated number of cells} = 200 \times (50\ d)^{2/3}$$

wherein "d" represents a density of a foamed particle.

Comparative Example

A reaction vessel of 1 l was charged 100 g of the same ethylene-vinyl acetate copolymer as used in Example 8 but in the non cross-linked condition and 100 g of styrene into which 2 g of dicumyl peroxide and 0.5 g of benzoyl peroxide were dissolved. Then to the mixture were added 1 g of magnesium pyrophosphate, 0.4 g of sodium dodecylbenzenesulfonate as an emulsifier and 500 g of demineralized water, and then the mixture was stirred. The temperature of the dispersion was raised to 80° C. and maintained at 80° C. for 4 hours so that the impregnation and polymerization of styrene took place. After raising the temperature of the reaction mixture to 140° C., the cross-linking reaction was carried out at 140° C. for 3 hours to give the modified cross-linked particles having an average particle size of about 1.2 mm.

Figure 2:
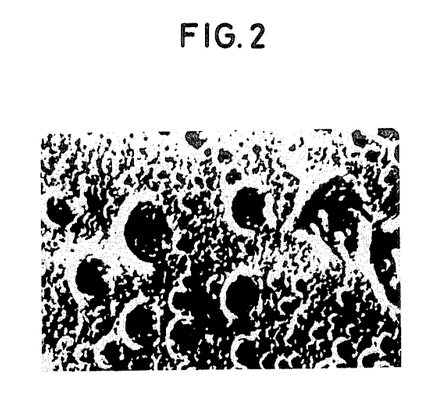
FIG. 2 is an electron microphotograph of 10,000 magnification showing a sliced surface of the conventional polyolefin particle.

FIG. 2 is an electron microphotograph of 10,000 magnification showing the sliced surface of the obtained particle which was sliced and treated in the same manner as in Example 8.

In comparison with FIG. 1, it can be easily understood that the particles obtained in this Comparative Example have various styrene polymer particles in particle size and include many large particles, and also the number of the styrene polymer particles was fewer than that of the particles obtained in Example 8.

The particles were further impregnated with dichlorodifluoromethane in the same manner as in Example 8, and then the particles were expanded by heating by means of steam under a pressure of 0.5 kg/cm² G for a period shown in Table 5. The number of cells of the obtained pre-expanded particles was measured. The results are shown in Table 5.

The cells of the obtained pre-expanded particles were as big as they are visible by naked eyes and not uniform in size, and the number of cells was small. Furthermore, the sliced surface of the pre-expanded particle was hard and rough.

TABLE 5

| Experimental No. | Period for heating and foaming (sec) | Density of pre-expanded particles (g/cm³) | Number of cells per mm² | Appearance of cells | Touch of surface |
| --- | --- | --- | --- | --- | --- |
| 1 | 4 | 0.045 | 84 | Cells were lack of uniformity and visible. | Rough |
| 2 | 7 | 0.037 | 63 | Cells were lack of uniformity and visible. | Rough |

Example 9

Low density polyethylene particles (Vicat softening point: 95° C., melting point: 112° C., MI: 1.5, density: 0.924 g/cm³) were cross-linked by using dicumyl peroxide in an amount shown in Table 6. A reaction vessel of 1 l was charged with 140 g of the obtained cross-linked polyethylene particles, and 60 g of styrene monomer into which 0.3 g of benzoyl peroxide was dissolved. After stirring the mixture in the same manner as in Example 8, the particles were impregnated with styrene for 2 hours at 90° C. The temperature of the reaction mixture was raised to 130° C. and the polymerization of styrene was carried out for 4 hours at 130° C. to obtain the modified cross-linked particles having an average particle size of about 2.7 mm. The thus obtained particles were impregnated with dichlorodifluoromethane at 60° C. under a dichlorodifluoromethane atmosphere to give expandable particles. The expandable particles were expanded by heating for 12 sec by means of steam in a known batchwise pressurized pre-expansion vessel under a pressure of 1.2 kg/cm² G. With respect to the obtained foamed particles, the cross-linking degree, the density and the number of cells were measured. The results are shown in Table 6.

TABLE 6

| Experimental No. | Amount of dicumyl peroxide (g) | Cross-linking degree (%) | Density of pre-expanded particles (g/cm³) | Number of cells per mm² | Appearance of cells | Touch of surface | Calculated number of cells per mm² |
| --- | --- | --- | --- | --- | --- | --- | --- |
| 1 | 0.13 | 8.9 | 0.082 | 63 | Cells were shrinked. | Rough | 512 |
| 2 | 0.15 | 15.4 | 0.055 | 221 | Celllls were partially disturbed. | Smooth | 393 |
| 3 | 0.18 | 25.3 | 0.049 | 374 | Cells were very uniform and fine. | Smooth and soft | 363 |
| 4 | 0.24 | 51.6 | 0.046 | 395 | Cells were | Smooth | 348 |

TABLE 6-continued

| Experimental No. | Amount of dicumyl peroxide (g) | Cross-linking degree (%) | Density of pre-expanded particles (g/cm$^3$) | Number of cells per mm$^2$ | Appearence of cells | Touch of surface | Calculated number of cells per mm$^2$ |
|---|---|---|---|---|---|---|---|
| | | | | | very uniform and fine. | and soft | |

As is clear from Table 6, when the cross-linking degree of the modified particle becomes low, the cells vary in size and become open cells to occur the shrinkage. Accordingly, it is preferable to employ a cross-linked polyethylene having a cross-linking degree of not less than about 15%.

Example 10

100 Parts of cross-linked polyethylene particles having a cross-linking degree of 50% and made of low density polyethylene particles (MI: 1.5, Vicat softening point: 95° C., melting point: 110° C., density: 0.921 g/cm$^3$) were impregnated with styrene in an amount shown in Table 7 into which benzoyl peroxide was dissolved in an amount of 0.5% of styrene. The styrene particles impregnated with styrene were subject to the polymerization in the same manner as in Example 9 to give the modified polyolefin particles having an average particle size of about 2 mm. The obtained particles were then impregnated with dichlorodifluoromethane in the same manner as in Example 9 and expanded by means of steam under a pressure of 1.2 kg/cm$^2$ G in a batchwise pressurized pre-expansion vessel by heating for 10 to 15 sec to give the pre-expanded particles having a density of 0.036 to 0.039 g/cm$^3$.

After measuring the number of cells of the pre-expanded particles, the pre-expanded particles were aged for 24 hours and placed in a mold with a cavity size of 40 mm×150 mm×200 mm which could not be unhermerically sealed but could shut the particles therein. After heating for 20 sec by means of steam under a pressure of 1.0 kg/cm$^2$ G, a foamed article was obtained. The foamed article was sliced with a knife after drying for 5 hours at 70° C., and the sliced surface was observed. The results are shown in Table 7.

As is clear from Table 7, the cells of interparticle and intraparticle are not varied in size and are uniformly distributed, and the sliced surface of the foamed article has excellent appearence and smooth and soft surface when the cross-linked polyethylene particles are impregnated with not less than 15 parts of styrene.

Example 11

Ethylene-vinyl acetate copolymer particles (vinyl acetate content: 10%, MI: 1.5, Vicat softening point: 73° C., density: 0.93 g/cm$^3$) were cross-linked by means of dicumyl peroxide to obtain cross-linking particles having a cross-linking degree of 52.4%. A reaction vessel of 40 l was charged with 2 kg of the obtained cross-linked particles, 50 g of magnesium pyrophosphate, 10 g of sodium dodecylbenzenesulfonate and 25 l of demineralized water. After stirring, to the mixture 1.8 kg, 3.6 kg, 5.4 kg or 7.2 kg of styrene was added and the cross-linked particles were impregnated with styrene by heating for 3 hours at 80° C. Then 0.2 kg, 0.4 kg, 0.6 kg or 0.8 kg of styrene into which benzoyl peroxide was dissolved in an amount of 3% of styrene was added to the mixture over 1 hour while maintaining the temperature of the mixture at 80° C. After the temperature was raised to 110° C., the polymerization was carried out for 5 hours at 110° C. to give modified cross-linked polyethylene particles having an average particle size of about 2 mm. The obtained particles were impregnated with dichlorodifluoromethane at 60° C. under a dichlorodifluoromethane atmosphere to give expandable particles.

The expandable particles were heated for 7 sec by means of steam under a pressure of between 0.8 and 1.2 kg/cm$^2$ G in a batchwise pressurized pre-expansion vessel to give pre-expanded particles having a density of 0.024 g/cm$^3$. The number of cells of the pre-expanded particles was measured. The results are shown in Table 8.

TABLE 7

| Experimental No. | Content of styrene (part) | Density of pre-expanded particles (g/cm$^3$) | Number of cells in particle per mm$^2$ | Calculated number of cells in particle mm$^2$ | Density of foamed article (g/cm$^3$) | Number of cells in foamed article per mm$^2$ | Calculated number of cells in foamed article per mm$^2$ | Appearance of sliced surface of foamed article | Touch of sliced surface of foamed article |
|---|---|---|---|---|---|---|---|---|---|
| 1 | 0 | 0.039 | 123 | 312 | 0.032 | 98 | 274 | Cells of interparticle and intraparticle were varied in size. | Soft but rough |
| 2 | 10 | 0.039 | 267 | 312 | 0.032 | 225 | 274 | Cells of interaparticle were not varied in size. | Smooth and soft |
| 3 | 15 | 0.038 | 324 | 307 | 0.031 | 279 | 268 | Cells were uniform and fine. | " |
| 4 | 20 | 0.038 | 348 | 307 | 0.031 | 294 | 268 | Cells were uniform and fine. | " |
| 5 | 30 | 0.038 | 373 | 307 | 0.031 | 306 | 268 | Cells were uniform and fine. | " |

TABLE 8

| Experimental No. | Content of styrene (part) | Density of pre-expanded particles (g/cm³) | Number of cells per mm² | Appearance of cells | Touch of surface | Calculated number of cells per mm² |
|---|---|---|---|---|---|---|
| 1 | 100 | 0.024 | 253 | Very uniform and fine | Smooth and soft | 225 |
| 2 | 200 | 0.024 | 239 | Very uniform and fine | Smooth | 225 |
| 3 | 300 | 0.024 | 207 | Very fine | Slightly rough | 225 |
| 4 | 400 | 0.024 | 74 | Cells were visible. | Too hard and rough | 225 |

As is clear from Table 8, the cell size of the foamed particle becomes large depending on the increase in the amount of the content of styrene. Thus, it is preferable to employ particles impregnated with not more than about 300 parts of styrene per 100 parts of polyethylene.

Example 12

Ethylene-vinyl acetate copolymer particles (vinyl acetate content: 5%, MI: 2, Vicat softening point: 83° C., density: 0.92 g/cm³) were cross-linked by means of dicumyl peroxide to give cross-linked particles having a cross-linking degree of 64.7%. A reaction vessel of 80 l was charged with 10 kg of the obtained particles, 10 kg of styrene, 40 g of calcium phosphate, 8 g of sodium dodecylbenzenesulfonate and 40 l of demineralized water. After stirring, the temperature of the mixture was raised to 140° C. and maintained at 140° C. for 5 hours so that the cross-linked particles were impregnated with styrene and the polymerization was carried out by means of the remaining dicumyl peroxide. As a result, modified cross-linked polyethyene particles having a particle size of 0.25 to 10 mm were obtained.

The thus obtained particles were impregnated with the foaming agent shown in Table 9 at 60° C. under an atmosphere saturated with the foaming agent, and heated by means of steam for 8 sec under a pressure of 0.5 kg/cm² G in a batchwise pressurized pre-expansion vessel to give pre-expanded particles. The density and the number of cells of the pre-expanded particles were measured. The results are shown in Table 9.

TABLE 9

| Experimental No. | Foaming agent | Density of pre-expanded particles (g/cm³) | Number of cells per mm² | Calculated number of cells per mm² |
|---|---|---|---|---|
| 1 | Dichlorodifluoromethane | 0.037 | 372 | 201 |
| 2 | Trichloromonofluoromethane | 0.041 | 395 | 323 |
| 3 | Dichlorotetrafluoroethane | 0.049 | 417 | 363 |
| 4 | n-Butane | 0.076 | 503 | 487 |
| 5 | iso-Butane | 0.065 | 468 | 439 |

In case of using n-butane or iso-butane as a foaming agent, the particles impregnate with the foaming agent were expanded after aging in the closed vessel for half a day, because in case of lacking of aging, the cells becomes open celles and the particles cannot be expanded when heated.

The pre-expanded particles prepared in Experimental No. 1 of this Example were placed in a mold which could not be unhermetically sealed but could shut the particles therein, and heated under pressure to give a foamed article. The foamed article had a density of 0.0268 g/cm³, and was excellent in elasticity and surface properties. The sliced surface of the article was also smooth and soft.

Figure 3:
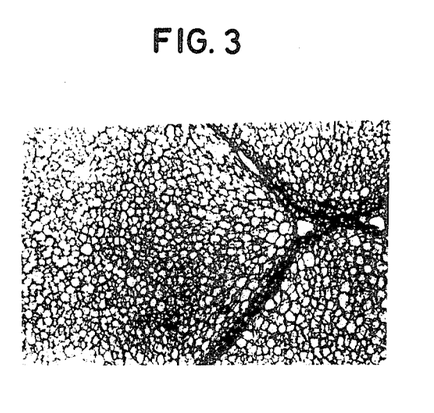
FIG. 3 is a microphotograph of 15 magnification showing a sliced surface of the foamed article of the present invention.

FIG. 3 is a microphotograph of 15 magnification showing the sliced surface of the thus obtained foamed article of the present invention.

Figure 4:
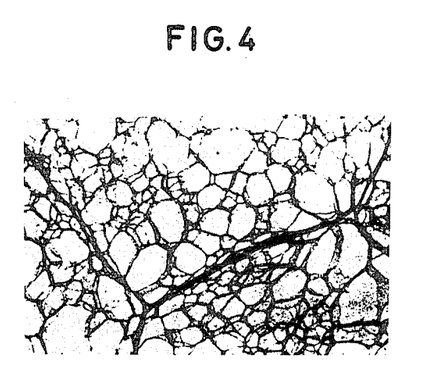
FIG. 4 is a microphotograph of 15 magnification showing a sliced surface of the commercially available foamed article.

FIG. 4 is a microphotograph of 15 magnification showing the sliced surface of a foamed article (commercially available under the commercial name "Pioflex" from Sekisui Kaseihin Kogyo Kabushiki Kaisha) prepared in a known manner in which ethylene-vinyl acetate copolymer particles are impregnated with styrene and cross-linked.

It can be clearly seen that the cells of the foamed article of the present invention shown in FIG. 3 are far more uniform and finer than the cells of the commercially available foamed article shown in FIG. 4.

What we claim is:

1. A process for preparing modified foamable polyolefin particles which comprises dispersing previously cross-linked polyolefin particles and a polymerizable vinyl monomer capable of dissolving or swelling the cross-linked polyolefin particles in an aqueous medium, the degree of crosslinking of the cross-linked polyolefin particles being from 10 to 80% by weight; impregnating the cross-linked polyolefin particles uniformly inside with the vinyl monomer; polymerizing the vinyl monomer within the impregnated polyolefin particles; and thereafter impregnating the resulting polyolefin particles with a foaming agent.

2. The process of claim 1, wherein the cross-linked polyolefin particles are impregnated with a polymerization initiator capable of initiating the polymerization of the vinyl monomer, before impregnating the particles with the vinyl monomer.

3. The process of claim 1, wherein the impregnation and the polymerization are carried out by heating the mixture to a temperature of not less than a softening point of the polyolefin which is not cross-linked.

4. The process of claim 3, wherein the impregnation and the polymerization are carried out by heating the mixture to a temperature of not less than a softening point of the polyolefin, which is not yet cross-linked, plus 5° C.

5. The process of claim 1, wherein the impregnation and the polymerization are carried out at the same time.

6. The process of claim 1, wherein the polyolefin is a homo- or co-polymer of monoolefinically unsaturated monomer selected from the group consisting of ethylene, propylene, butene-1, pentene-1, 3-methylbutene-1, 4-methylhexene-1 and 5-methylhexene-1, a copolymer selected from the group consisting of ethylene-vinyl acetate copolymer, ethylene-vinyl chloride copolymer and ethylene-methyl methacrylate copolymer, or an admixture thereof.

7. The process of claim 1, wherein the polymerizable vinyl monomer is a styrene monomer.

8. The process of claim 1, wherein the cross-linked polyolefin is divided into a plurality of fine spaces by intermolecular cross-linkage, the vinyl monomer is introduced into said finely divided spaces during said impregnation and the monomer is then polymerized within said spaces whereby the resulting modified polyolefin particles have a plurality of fine vinyl polymer particles uniformly distributed therein.

9. A foamed article of a polyolefin which comprises a fundamental material of a previously cross-linked polyolefin made by impregnating the cross-linked polyolefin with a polymerizable vinyl monomer uniformly therein, the degree of crosslinking of the cross-linked polyolefin being from 10 to 80% by weight, and by polymerizing the monomer within said polyolefin, and which contains not less than 200 closed cells per 1 mm² of the foamed article.

10. The article of claim 9, wherein the number of the closed cells is the number represented by the equation:

Number of closed cells $\geqq 200 \times (50d)^{2/3}$ in which d is a density (g/cm³) of the foamed article and is selected from a range of 0.02 to 0.08.

11. The article of claim 9, wherein the polymerizable vinyl monomer is a styrene monomer.

12. The article of claim 9, wherein the polyolefin is a homo- or co-polymer of monoolefinically unsaturated monomer selected from the group consisting of ethylene, propylene, butene-1, pentene-1, 3-methylbutene-1, 4-methylbutene-1, 4-methylhexene-1 and 5-methylhexene-1, a copolymer selected from the group consisting of ethylene-vinyl acetate copolymer, ethylene-vinyl chloride copolymer and ethylene-methyl methacrylate copolymer, or an admixture thereof.

13. The article of claim 11, wherein the cross-linking degree of the cross-linked polyolefin is 15 to 80% by weight.

14. The article of claim 9, wherein the foamed article comprises 13 to 75% by weight of the styrene polymer portion and 87 to 25% by weight of the polyolefin portion.

15. The article of claim 9, wherein said fundamental material is foamed by introducing a foaming agent therein and then heating to cause the material to expand.

16. The article of claim 9, wherein said fundamental material comprises a plurality of modified polyolefin particles each containing a plurality of fine vinyl polymer particles uniformly distributed therein.

17. The article of claim 16, wherein the particle size of the cross-linked polyolefin particles is about 0.25 to 10 mm.

* * * * *